(12) United States Patent
Ronen et al.

(10) Patent No.: US 9,053,022 B2
(45) Date of Patent: Jun. 9, 2015

(54) SYNCHRONOUS SOFTWARE INTERFACE FOR AN ACCELERATED COMPUTE ENGINE (75) Inventors: Ronny Ronen, Haifa (IL); Boris Ginzburg, Haifa (IL); Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 13/994,371

(22) PCT Filed: Dec. 30, 2011

(86) PCT No.: PCT/US2011/068072
§ 371 (c)(1),
(2), (4) Date: Jun. 14, 2013

(87) PCT Pub. No.: WO2013/101175
PCT Pub. Date: Jul. 4, 2013

(65) Prior Publication Data
US 2013/0268804 A1 Oct. 10, 2013

(51) Int. Cl.
G06F 11/00 (2006.01)
G06F 11/07 (2006.01)
G06F 9/54 (2006.01)
G06F 11/14 (2006.01)
G06F 9/44 (2006.01)
G06F 9/38 (2006.01)

(52) U.S. Cl.
CPC ........ *G06F 11/0724* (2013.01); *G06F 11/0793* (2013.01); *G06F 9/542* (2013.01); *G06F 11/1474* (2013.01); *G06F 9/4425* (2013.01); *G06F 9/3881* (2013.01); *G06F 9/54* (2013.01)

(58) Field of Classification Search
CPC .................. G06F 11/0724; G06F 11/0793
See application file for complete search history.

(56) References Cited

U.S. PATENT DOCUMENTS

| 7,003,630 | B1 * | 2/2006 | Kissell ............... 711/141 |
| 7,017,025 | B1 * | 3/2006 | Kissell ............... 711/206 |
| 7,739,316 | B2 | 6/2010 | Thompson et al. |
| 7,873,869 | B2 | 1/2011 | Darrington et al. |
| 8,589,931 | B2 | 11/2013 | Barsness et al. |
| 2006/0282839 | A1 * | 12/2006 | Hankins et al. ......... 719/318 |
| 2007/0006231 | A1 * | 1/2007 | Wang et al. ........... 718/100 |
| 2010/0083012 | A1 | 4/2010 | Corbridge et al. |

OTHER PUBLICATIONS

PCT International Search Report for PCT Counterpart Application No. PCT/US2011/068072, 3 pgs., (Jun. 14, 2012).

(Continued)

*Primary Examiner* — Joshua P Lottich
(74) *Attorney, Agent, or Firm* — Nicholson De Vos; Webster & Elliott, LLP (57) ABSTRACT

Some implementations disclosed herein provide techniques and arrangements for a synchronous software interface for a specialized logic engine. The synchronous software interface may receive, from a first core of a plurality of cores, a control block including a transaction for execution by the specialized logic engine. The synchronous software interface may send the control block to the specialized logic engine and wait to receive a confirmation from the specialized logic engine that the transaction was successfully executed.

20 Claims, 5 Drawing Sheets

(56) References Cited

OTHER PUBLICATIONS

PCT Written Opinion of the International Searching Authority for PCT Counterpart Application No. PCT/US2011/068072, 4 pgs., Jun. 14, 2012).

PCT Notification concerning Transmittal of International Preliminary Report on Patentability (Chapter I of the Patent Cooperation Treaty) for PCT Counterpart Application No. PCT/US2011/068072, 6 pgs., (Jul. 10, 2014).

* cited by examiner

SYNCHRONOUS SOFTWARE INTERFACE FOR AN ACCELERATED COMPUTE ENGINE

CROSS-REFERENCE TO RELATED APPLICATIONS

This patent application is a U.S. National Phase Application under 35 U.S.C. §371 of International Application No. PCT/US2011/068072, filed Dec. 30, 2011, entitled SYNCHRONOUS SOFTWARE INTERFACE FOR AN ACCELERATED COMPUTE ENGINE.

TECHNICAL FIELD

Some embodiments of the invention generally relate to the operation of processors. More particularly, some embodiments of the invention relate to a synchronous software interface for an accelerated compute engine.

BACKGROUND

A processor may include a particular unit to perform specialized functions, such as graphics-related functions (e.g., texture mapping, histogram generation, and the like) or multimedia-related functions (e.g., video encoding/decoding and the like). The particular unit may enable applications to use the particular unit to perform various specialized functions but may not handle certain events, such as page faults. For example, when a page fault occurs, the particular unit may report a page fault error to the application and request the application to address the page fault. However, most applications may be incapable of addressing a page fault as an operating system usually handles page faults.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Enabling Access to a Resource in a Processor

The technologies described herein generally relate to providing a software interface that enables access to a computing resource in a processor. While an accelerated compute engine (ACE) is used herein as an example of a resource, the technologies described herein may be used to enable access to other processor-related resources, such as resources internal to or external to the processor. In addition, while the examples described herein illustrate a single ACE that is shared by multiple cores, in some implementations, a processor may have more than one ACE. For example, a processor may include multiple ACE units, with each ACE being shared by a particular number of cores. To illustrate, if a single ACE is capable of supporting four cores, a processor with eight cores may have two ACE units, a processor with twelve cores may have three ACE units, and so on. Thus, in some cases, the number of ACE units may be proportional to the number of cores, based on how many cores a single ACE is capable of supporting.

As used herein, the term core refers to a processing core, such as a logical processing core or a physical core (e.g., an execution unit and associated caches). To illustrate, a technique such as hyper-threading may be used to provide two (or more) logical cores from the resources of a single physical core. Thus, a processor with two physical cores may provide a total of four logical processors that are capable of simultaneously executing four threads.

An ACE may provide specialized functionality to one or more cores (e.g., general purpose cores) in a processor. For example, the ACE may provide the cores in the processor with fine-grained control over specialized functions, such as graphics functions or arithmetic functions. To illustrate, a conventional graphics processing unit (GPU), when called upon by a core, may perform a function that takes on the order of millions of cycles to complete. In contrast, the ACE may perform functions that take on the order of hundreds of cycles or thousands of cycles to complete. By incorporating specialized resources, such as the ACE, a processor may achieve a significant increase in performance, particular in areas such as graphics processing or multimedia processing, as compared to processors that do not include such specialized resources.

As another example of the fine-grained control, applications (e.g., threads) executing on the multiple cores may directly access the ACE. Direct access means that the applications may access the ACE without using an intermediary, such as a device driver, application programming interface (API), operating system, and the like. Applications may directly access the ACE while the applications are executing in user-mode (e.g., rather than in kernel-mode). In some implementations, an operating system may be aware of the ACE while in other implementations the operating system may be unaware of the ACE. Applications may be allowed direct access to the ACE regardless of whether or not the operating system is aware of the ACE. In addition, in an implementation where the operating is unaware of the ACE, managing the resources (e.g., memory management and the like) of the ACE may be performed by hardware or by software (e.g., software that is different from the operating system). Thus, if an operating system is aware of the ACE, the operating system may manage the ACE resources. If an operating is unaware of the ACE, the operating system may not manage the ACE resources. Instead, the ACE resources may be managed by hardware or by software that is not included in the operating system.

As yet another example of the fine-grained access, virtual addresses associated with the threads may be shared between the multiple cores and the ACE to enable the ACE to directly access the address spaces associated with the threads. However, because the ACE can access virtual memory, the ACE may generate page faults. A page fault may occur when the ACE initiates access to a virtual memory location that has not been loaded into physical memory. The ACE may be unable to handle page faults. Instead, the ACE may return a status indicating that a request was not completed due to a page fault.

The multiple threads may interact with the ACE using an ACE control block (ACB). For example, the ACB may include (1) a header block that includes a status (e.g., new, inside execution pipe, done, page fault, invalid, and the like) associated with execution of instructions in the ACB, (2) an input parameter space identifier that identifies a location of input parameters, (3) an output data space identifier that identifies a location to output the results of processing the input parameters, and (4) an output error space identifier that identifies a location to output error-related data, such as error messages and data dumps (e.g., contents of registers, caches, pipelines, and the like). For example, the output data space identifier may include a virtual address space associated with a thread that sent the ACB to the ACE. The status field may thus indicate whether a particular event, such as a page fault, occurred. Of course, the ACB may include other content in addition to or instead of the previously described content. For example, the content of the ACB may vary depending on the particular function of the ACE that is being called. The ACB may also be referred to herein as a transaction or a request.

However, from the standpoint of the thread, a disadvantage of an asynchronous interface is that events such as page faults are not handled transparently. Instead, a programmer writing an application to access an ACE should include software instructions to handle various events, such as page faults.

However, writing applications that interact asynchronously with the ACE and that are capable of handling various events, such as a page fault, may be burdensome on programmers. In addition, existing applications may need to be rewritten to include page fault handling and to account for the asynchronous operation. Therefore, a synchronous interface may be provided that handles events, such as page faults, in a way that is transparent to a calling thread. Providing transparent handling of events, such as page faults, may enable more efficient application programming and may enable previously written applications to be modified with relatively small changes to access the ACE.

The following pseudo-code examples ("//" indicates a comment) demonstrate the relative complexity of writing applications that can handle asynchronous operation as compared to synchronous operation:

```
Asynchronous:

send_status = ACE_AsynchCall (pACB, ACB_size);        // pACB is pointer to ACB
if (send_status != OK) then <handle_error, exit>;     // ACB queue full etc.
<execute other instructions including other calls to the ACE>;
while ((status = ACE_check (pACB)) == ACE_INPROGRESS)
       <delay or execute other instructions>;          // still in progress
// Assume execution of other instructions stops if the ACE_check (pACB) is not in progress
if (status == ACE_PF) then
       <handle page fault, call Process_ACB>;          // handle PF and start over
if (status == ACE_ERROR) then <handle_error, exit>;    // wrong ACB format etc.
if (status == ACE_DONE) then <continue>;               // call completed Synchronous:

status = ACE_SynchCall (pACB, ACB_size);              // Call synchronous interface
if (status = ACE_ERROR) then <handle_error, exit>;    // wrong ACB format etc.
<continue>;                                            // call completed
```

The hardware interface associated with the ACE may operate asynchronously. For example, a thread may send an ACB to the ACE and the thread may continue to execute other instructions. The thread may periodically monitor the status of the ACB. If a page fault occurs after the ACE initiates processing the transaction, the ACE may change the status field in the ACB to indicate that a page fault occurred. The ACE may return the ACB to a thread that sent the ACB to indicate to the thread that the transaction was not completed. At a later time, the thread may check the status flag. If the status flag indicates that the transaction is pending, the thread may continue to process other instructions or wait while periodically checking the status of the ACB. If the status flag indicates that unrecoverable errors occurred, the thread may initiate handling the errors and resend the ACB to the ACE. If the status flag indicates that a page fault occurred, the thread may initiate handling the page fault and resend the ACB to the ACE. If the status flag indicates that the transaction was successfully completed, the thread may process a result of the transaction.

Asynchronous operation is efficient, because the thread and the ACE may both execute in parallel, and may achieve higher performance as compared to a synchronous operation. Thus, when an asynchronous interface is used to access the ACE, page-faults may be returned as errors for the thread to handle rather than being treated as an exception condition.

When handling events, such as page faults, a loop may be formed, resulting in a lack of forward progress. For example, when a page fault occurs, a page fault handler module may be called. When handling the page fault, the page fault handler module may cause another page fault, and the page fault handler may be called again, and so on. The synchronous interface may be written to detect and handle the lack of forward progress.

Thus, a resource in a processor (e.g., an ACE) may provide an asynchronous interface to applications. The asynchronous interface may result in applications that call the ACE to include instructions to handle various events, such as page faults, error conditions, and the like. To enable applications to avoid performing event handling, a synchronous software interface to the ACE may provide transparent handling of events, such as page faults and lack of forward progress.

Example Framework

Figure 1:
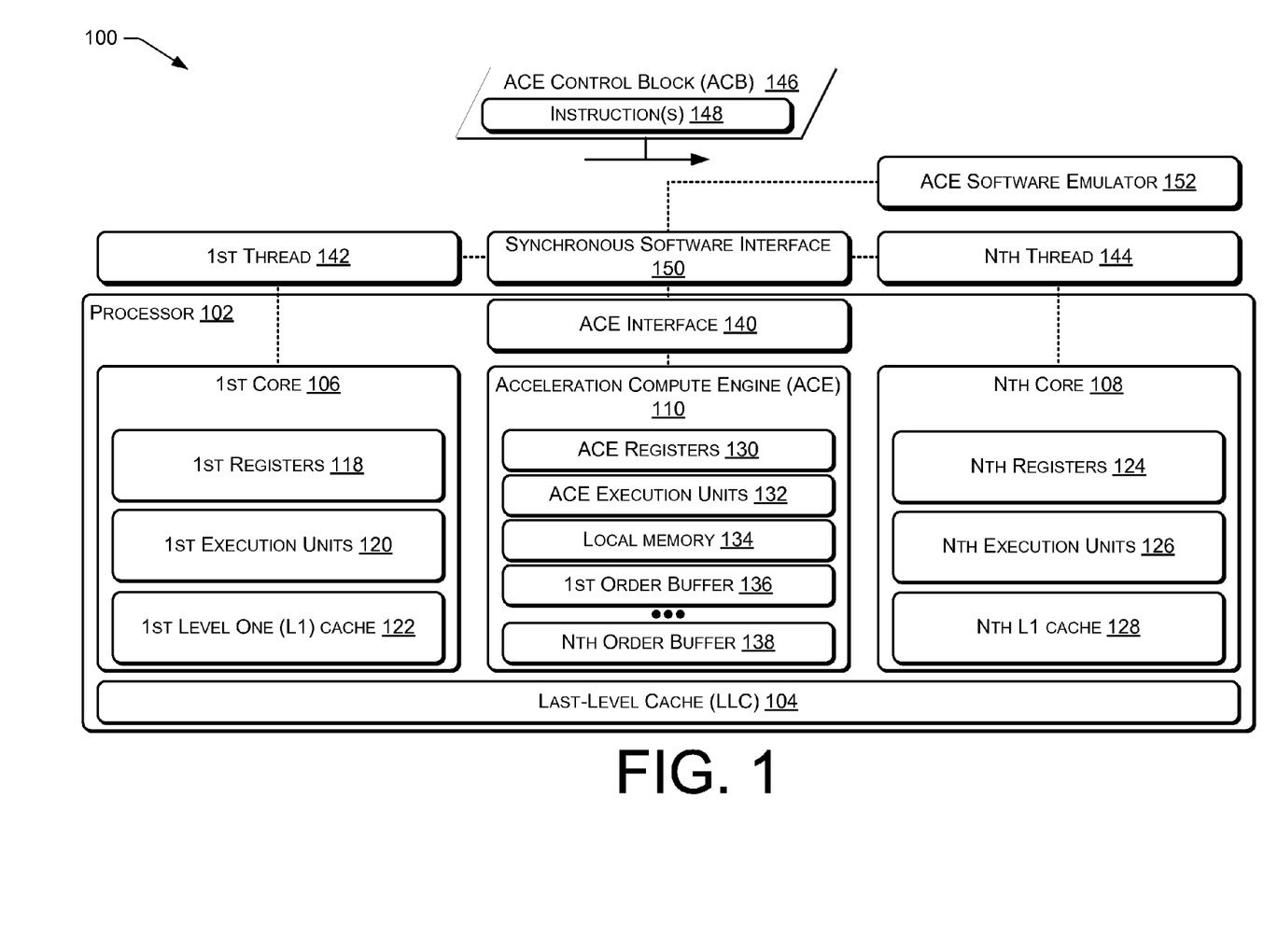
FIG. 1 illustrates an example framework including a synchronous software interface, according to some implementations.

FIG. 1 illustrates an example framework 100 that includes an acceleration compute engine (ACE) according to some implementations. The framework 100 includes a processor 102. The processor 102 may include a last-level cache (LLC) 104, a first core 106, and additional cores up to and including an $N^{th}$ core 108 (where N is greater than 1), and an ACE 110.

Each of the N cores 106 to 108 may include one or more registers, one or more execution units, and one or more levels of cache memory. For example, the first core 106 may include a first set of registers 118, a first set of execution units 120, and a first level one (L1) cache 122. The $N^{th}$ core 108 may include an $N^{th}$ set of registers 124, an $N^{th}$ set of execution units 126, and an $N^{th}$ L1 cache 128. The N cores 140 to 142 may be logical cores or physical cores.

The ACE 110 may include registers, execution units, memory, and the like. For example, the ACE 110 may include one or more ACE registers 130, one or more ACE execution units 132, a local memory 134, a first order buffer 136, and additional order buffers up to and including an $N^{th}$ order buffer 138 (where N>1). The local memory 134 may include cache memory, random access memory, other types of computer-readable storage media, or any combination thereof. Each of the N order buffers 136 to 138 may correspond to the N cores 106 to 108. For example, the first order buffer 136 may correspond to the first core 106 and the $N^{th}$ order buffer 138 may correspond to the $N^{th}$ core 108. Each of the N order buffers 136 to 138 may be used to keep track of in-flight transactions (e.g., transactions sent for execution to an ACE execution unit) to enable handling page faults and context switches. The ACE 110 may provide an ACE interface 140 to enable applications to access the ACE 110. In some implementations, the ACE interface 140 may operate asynchronously.

The content in each of the N order buffers 136 to 138 may include part of a process state and may be preserved across context switches. The N order buffers 136 to 138 may each be implemented as an array, such as a cyclical buffer that is an internal structure of the ACE 110. For example, the order buffer 136 may include a pointer ("pACB") to an ace control block that includes information for a particular transaction.

Each of the N order buffers 136 to 138 may include information, such as a size of an ACB and a status field identifying a status of the transaction, such as, whether the transaction is a new transaction, whether the transaction is inside an execution pipe, whether the transaction is done, whether a page fault has occurred, or whether the transaction has been invalidated. Each of the N order buffers 136 to 138 may include one or more index registers, such as a first register ("head") that indexes the first active transaction that is still in flight for a thread executing on a particular core, a second register ("tail") that indexes a next to last active transaction of the thread, and a third register ("next") that indexes the next transaction to be sent for execution.

In operation, the first core 106 may execute a first thread 142 and the $N^{th}$ core 108 may execute an $N^{th}$ thread 144. One of the threads 142 or 144 may send an ACB 146 to a synchronous software interface 150 for execution by the acceleration compute engine 110. For example, one of the threads 142 or 144 may send a pointer to the ACB 146, referred to as a pACB. The ACB 146 may include one or more instructions 148 for execution by the ACE 110. For example, the ACB 146 may include a header block that includes a status (e.g., new, inside execution pipe, done, page fault, invalid, and the like) associated with execution of the instructions 148. The ACB 146 may include an input parameter space identifier that identifies a location of input parameters to the ACE 110. The ACB 146 may include an output data space identifier that identifies a location to output the results of processing the input parameters and/or the instructions 148. The ACB 146 may include an output error space identifier that identifies a location to output error-related data, such as error messages and data dumps (e.g., contents of registers, caches, pipelines, and the like). Of course, the ACB may include other content in addition to or instead of the previously described content. For example, the content of the ACB may vary depending on the particular function of the ACE that is being called.

In response to receiving a pointer to the ACB 146 from one of the threads 138 or 140, the synchronous software interface 150 may call the ACE interface 140 with the pointer to the ACB 146. In the call to the ACE interface 140, the synchronous software interface 150 may include parameters, such as a size of the ACB 146, in addition to the pointer to the ACB 146. The synchronous software interface 150 may wait for a predetermined period of time (e.g., ten milliseconds, one hundred milliseconds, and the like) before checking a status field of the ACB 146.

After checking the status field of the ACB 146, the synchronous software interface 150 may perform one or more actions in response to (e.g., based on) a status indicated by the status field. For example, if the status field indicates that a page fault occurred, the synchronous software interface 150 may handle the page fault by determining that the page fault was caused when the ACE 110 initiated access to a particular virtual address. The synchronous software interface 150 may cause a physical address space on a storage device (e.g., a disk drive) to be paged (e.g., loaded) into a main memory (e.g., random access memory). The physical address space may correspond to a virtual address space that includes the particular virtual address. The synchronous software interface 150 may handle the page fault by instructing an appropriate hardware or software entity, such as a memory controller or an operating system, to page in the physical address space corresponding to the virtual address space. The page fault handling may be implemented at an application-level (e.g., without direct access to system resources). For example, the page fault handler of the synchronous software interface 150 may generate a page fault to cause the operating system to fetch the physical address space by initiating access to the same virtual address that caused a page fault when the ACE initiated access. In some implementations, the page fault may be generated by the thread that sent the transaction to the ACE. After handling the page fault, the synchronous software interface 150 may restart processing of the ACB 146 by calling the ACE interface 140 and passing along a pointer to the ACB 146. If appropriate, the synchronous software interface 150 may also include additional parameters (e.g., ACB size and the like). When the status field of the ACB 146 indicates that the transaction was successfully completed, the synchronous software interface 150 may return the pointer to the ACB 146 to the thread that initiated the transaction.

The synchronous software interface 150 may keep track (e.g., using a counter or similar mechanism) a number of times that processing of a particular ACB, such as the ACB 146, has been restarted. If the number of times that execution of the particular ACB has been restarted satisfies a predetermined threshold, the synchronous software interface 150 may perform an action other than restarting processing of the ACB 146 after handling the page fault. For example, if the synchronous software interface 150 determines that processing of the ACB 146 by the ACE 110 has been restarted more than a predetermined number of times (e.g., three times), the synchronous software interface 150 may send the ACB 146 to a software emulator 152 corresponding to the ACE 110. The software emulator 152 may emulate, using software instructions, the functions of the ACE 110, and may be executed by one or more of the N threads 142 to 144. Though the software emulator 152 may take a longer time complete execution of a transaction, such as the ACB 146, as compared to the ACE 110, situations in which a lack of forward progress occurs are typically infrequent. When the status field of the ACB 146 indicates that the transaction was successfully completed, the synchronous software interface 150 may return the pointer to the ACB 146 to the thread that initiated the transaction.

If the status field of the ACB 146 indicates that the ACE 110 was unable to complete the transaction due to an event other than a page fault, or page fault exception that cannot be solved like access violation issue, the synchronous software interface 150 may indicate to one of the threads 142 to 144 (e.g., a particular thread that sent the pointer to the ACB 146) that the transaction was not completed. In some cases, the Synchronous Software Interface 150 may provide additional information regarding the event by writing the additional information to an error output space identified in the ACB 146. For example, the synchronous software interface 150 may provide an intermediate result, contents of one or more of the ACE registers 130, at least some of the information from the associated order buffer, an error message, other information related to the status field of the ACB 146, or any combination thereof. The intermediate result may be used by the ACE 110 when recovering from an event, such as a page fault exception is possible. For example, if supported by an operating system, the intermediate result (e.g., page fault exception) may be passed to the operating system. After the operating system has performed one or more actions in response to receiving the intermediate result (e.g., page fault exception), the ACE may continue processing the transaction.

Example Pseudo Code to Implement a Synchronous Software Interface

An example of pseudo code to implement a software layer to provide a synchronous software interface that provides transparent handling of page faults and detects and handles lack of forward progress is provided below. Names starting w/ "h" (e.g., "hNNNN") refer to entities that the hardware supports directly.

ACE_SCall may be called by a thread to access the ACE 110. ACE_SCall operates synchronously in that ACE_SCall returns after the ACB 146 has been processed. The thread that called ACE_SCall may wait until the call to ACE_SCall completes. The ACE_SCall calls ACE_ACall (e.g., the asynchronous ACE interface 140). pACB is a pointer to the ACB 146. Delay-for-a-while is a module that delays for a predetermined amount of time. Status is a module that checks a status field of the ACB 146.

```
status = ACE_SCall(pACB){
           ACE_ACall(pACB);
           delay-for-a-while;
           return ACE_Check_Wait(pACB);}
```

ACE_ACall is the asynchronous ACE interface 140. ACE_ACall may be an interface provided by the ACE 110 to call hACE_Call (e.g., a call to the ACE hardware). ACE_ACall(pACB){hACE_Call(pACB); return;}

ACE_Check_Wait returns when the ACE 110 successfully completes the transaction, including any restarts caused by page faults. ACE_Check_Wait performs both the page fault handling and waiting (e.g., delay) for completion so that the page fault handling and waiting for completion are transparent to the threads. ACE_InProgress is one of the possible statuses that can be indicated by the status field. ACE_InProgress indicates that the ACE 110 is processing the transaction (e.g., the ACB 146).

```
status = ACE_Check_Wait(pACB)){
           while ((status=ACE_Check(pACB)) == ACE_InProgress)
             delay-for-a-while;}
```

ACE_Check returns when the ACE hardware completes the transaction (e.g., the ACB 146) and after handling any page faults that may have occurred during processing of the transaction. "!=" means "not equal."

```
status = ACE_Check(pACB){
           hStatus = pACB -> status;
           If (hStatus != ACE_PF) return hStatus;   // not a page fault -
                                                     return hStatus
           touch(faulting addresses);               // handle page fault
           // e.g., operating system may handle the page fault
           hACE_Call(pACB);
           return ACE_InProgress;}
```

Thus, the synchronous software interface 150 may provide synchronous operation and transparent handling of events (e.g., page faults, lack of forward progress, and the like) to threads executing on the N cores 106 to 108. The synchronous software interface 150 may enable application programmers to write smaller and simpler software applications that can take advantage of the functions of the ACE 110 because the software applications may be written without including event handling modules. The ease of writing applications that call the ACE 110 to perform specialized functions may result in more applications that use the ACE 110 being written.

Figure 2:
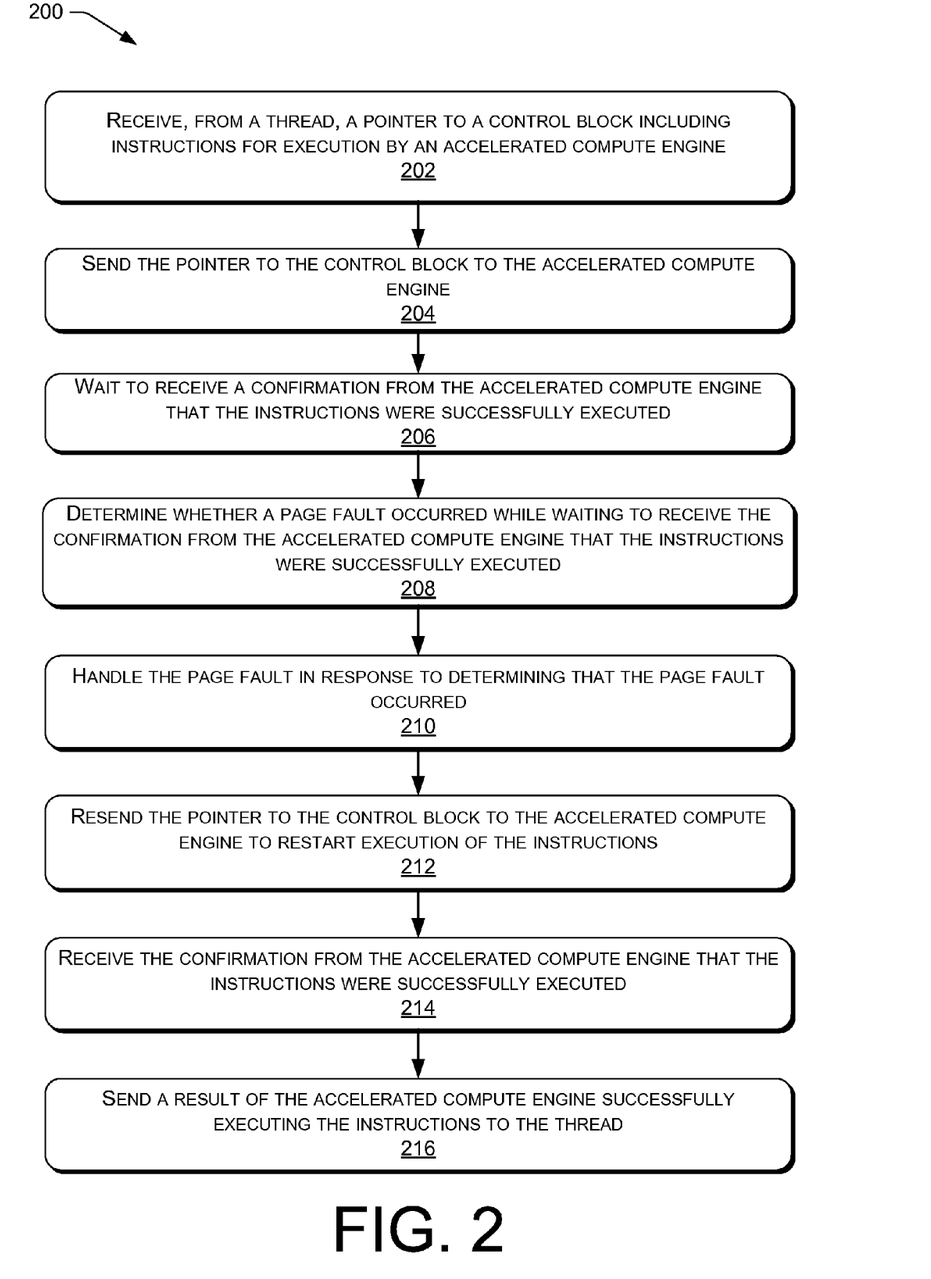
FIG. 2 illustrates a flow diagram of an example process that includes detecting whether a page fault occurred, according to some implementations.

FIG. 2 illustrates a flow diagram of an example process 200 that includes detecting whether a page fault occurred, according to some implementations. The process 200 may be performed by the synchronous software interface 150 of FIG. 1.

At 202, a pointer to a control block is received from a thread. The control block includes one or more instructions for execution by an accelerated computer engine. For example, in FIG. 1, the synchronous software interface 150 may receive the ACB 146 from one of the N threads 142 to 144.

At 204, the pointer to the control block is sent to the accelerated compute engine. For example, in FIG. 1, the synchronous interface 150 may call a lower-level asynchronous interface, such as the ACE interface 140, and include a pointer to the ACB 146.

At 206, the synchronous software interface waits for a confirmation from the accelerated compute engine that the instructions were successfully executed. For example, in FIG. 1, the synchronous software interface 150 may repeatedly (e.g., in a loop) perform a wait (e.g., delay) for a particular period of time and check a status field of the ACB 146. Based on the status field, the synchronous software interface 150 may perform one or more actions. The one or more actions may include repeatedly performing the wait and checking the status field of the ACB 146. For example, the synchronous software interface 150 may repeatedly wait and check the status field while the status field indicates that the ACE 110 is processing the ACB 146. The synchronous software interface 150 may confirm that the instructions 148 were successfully completed when the status field of the ACB 146 indicates that the ACB 146 was successfully processed.

At 208, while waiting to receive the confirmation from the ACE that the instructions were successfully completed, a determination may be made that a page fault occurred. For example, in FIG. 1, after checking the status field of the ACB 146, the synchronous software interface 150 may determine that a page fault occurred based on the status field.

At 210, in response to determining that the page fault occurred, handling the page fault. For example, in FIG. 1, in response to determining that the status field of the ACB 146 indicates that a page fault occurred, the synchronous software interface 150 may handle the page fault using a lower-level software module (e.g., device driver, operating system utility, and the like).

At 212, the pointer to the control block may be re-sent to the accelerated compute engine to restart execution of the instructions. The control block may be re-sent to the ACE after the exception handler successfully handles the exception. The control block may be re-sent to enable the accelerated compute engine to identify situations where there is a lack of forward progress. For example, in FIG. 1, after handling the page fault, the synchronous software interface 150 may call the ACE interface 140 and include the pointer to the ACB 146 as one of the parameters in the call.

At 214, a confirmation is received from the accelerated compute engine that the instructions were successfully executed. For example, in FIG. 1, the synchronous software interface 150 may confirm that the ACE 110 successfully completed execution of the instructions 148 based on the status field of the ACB 146.

At 216, a result of the accelerated compute engine successfully executing the instructions may be sent to the thread. For example, in FIG. 1, when the status field of the ACB 146 indicates that the ACE successfully executed the instructions 148, the synchronous software interface 150 may return the pointer to the ACB 146 to the particular thread that initially sent the pointer to the synchronous software interface 150.

Thus, a synchronous software interface may receive a pointer to an ACB from a thread and call a lower-level asynchronous interface to an ACE. The call to the lower-level asynchronous interface may include the pointer to the ACB and other parameters used by the asynchronous interface. The asynchronous interface may provide the pointer to the ACB to the ACE. The synchronous software interface may handle events, such as page faults and lack of forward progress and return a result of the ACE executing the ACB to the thread. Thus, the synchronous software interface may provide a synchronous operation and transparent handling of events to multiple threads executing on multiple cores in a processor.

Figure 3:
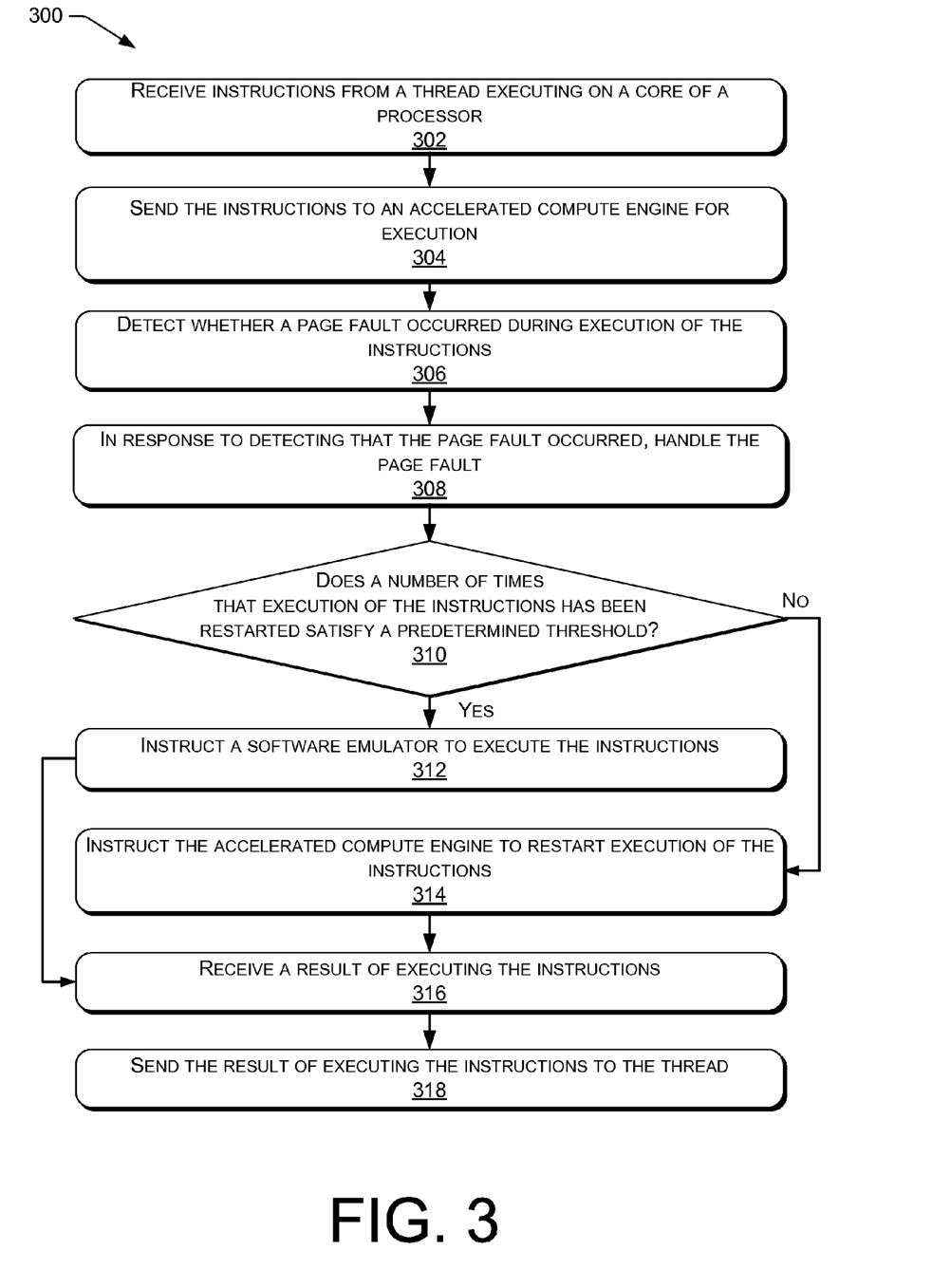
FIG. 3 illustrates a flow diagram of an example process that includes handling a page fault according to some implementations.

FIG. 3 illustrates a flow diagram of an example process that includes handling a page fault according to some implementations. The process 300 may be performed by the synchronous software interface 150 of FIG. 1.

At 302, instructions are received from a thread executing on a core of a processor. For example, in FIG. 1, the synchronous software interface 150 may receive the ACB 146 including the one or more instructions 148 from one of the N threads 142 to 144.

At 304, the instructions are sent to an accelerated compute engine for execution. For example, in FIG. 1, the synchronous interface 150 may call a lower-level asynchronous interface, such as the ACE interface 140, and include a pointer to the ACB 146.

At 306, the synchronous software interface may detect whether a page fault occurred during execution of the instructions. For example, in FIG. 1, after checking the status field of the ACB 146, the synchronous software interface 150 may determine (e.g., based on the status field of the ACB 146) that a page fault occurred. For example, if the ACE 110 encounters a page fault after initiating execution of the instructions 148, the ACE may set the status field of the ACB 146 to indicate that a page fault occurred and return the pointer (to the ACB 146) to the synchronous software interface 150 to enable the synchronous software interface 150 to handle the page fault.

At 308, in response to determining that the page fault occurred, handling the page fault. For example, in FIG. 1, in response to determining that the status field of the ACB 146 indicates that a page fault occurred, the synchronous software interface 150 may handle the page fault using a lower-level hardware unit (e.g., memory controller) or a lower-level software module (e.g., device driver, operating system utility, and the like).

At 310, the accelerated compute engine may be instructed to restart execution of the instructions. For example, in FIG. 1, after handling the page fault, the synchronous software interface 150 may call the ACE interface 140 with the pointer to the ACB 146 to restart the execution of the instructions 148. The control block may be re-sent to the ACE after the exception handler successfully handles the exception. The control block may be re-sent to enable the accelerated compute engine to count how many times a particular control block has been resent, to enable the accelerated compute engine to identify situations where there is a lack of forward progress.

At 312, a determination is made whether a number of times that execution of the instructions has been restarted satisfy a predetermined threshold. For example, in FIG. 1, the synchronous software interface 150 may keep track (e.g., via a counter) as to a number of times a particular set of instructions (e.g., the instructions 148) have been restarted (e.g., repeatedly sent to the ACE 110).

If a determination is made that a number of times that execution of the instructions has been restarted satisfy a predetermined threshold, at 312, a software emulator may be instructed to execute the instructions, at 314. For example, in FIG. 1, the synchronous software interface 150 may sent the pointer to the ACB 146 to the software emulator 152 and instruct the software emulator 152 to execute the instructions 148.

At 316, a result of executing the instructions may be received. For example, in FIG. 1, either the ACE 110 or the software emulator 152 may complete execution of the instructions 148 and set the status field of the ACB 146 to indicate that the instructions 148 were successfully executed.

At 318, the results of executing the instructions may be sent to the thread. For example, in FIG. 1, the synchronous software interface 150 may, based on the status field of the ACB 146, indicate to one of the N thread 142 to 144 that the instructions 148 were successfully executed.

Thus, a synchronous software interface may receive a pointer to an ACB that includes instructions from a thread. The synchronous software interface may call an asynchronous interface with the pointer to the ACB and any other parameters used by the asynchronous interface. The asynchronous interface may provide the pointer to the ACB to the ACE to enable the ACE to initiate execution of the instructions. The synchronous software interface may handle events, such as page faults and lack of forward progress, transparently from the standpoint of the thread.

Figure 4:
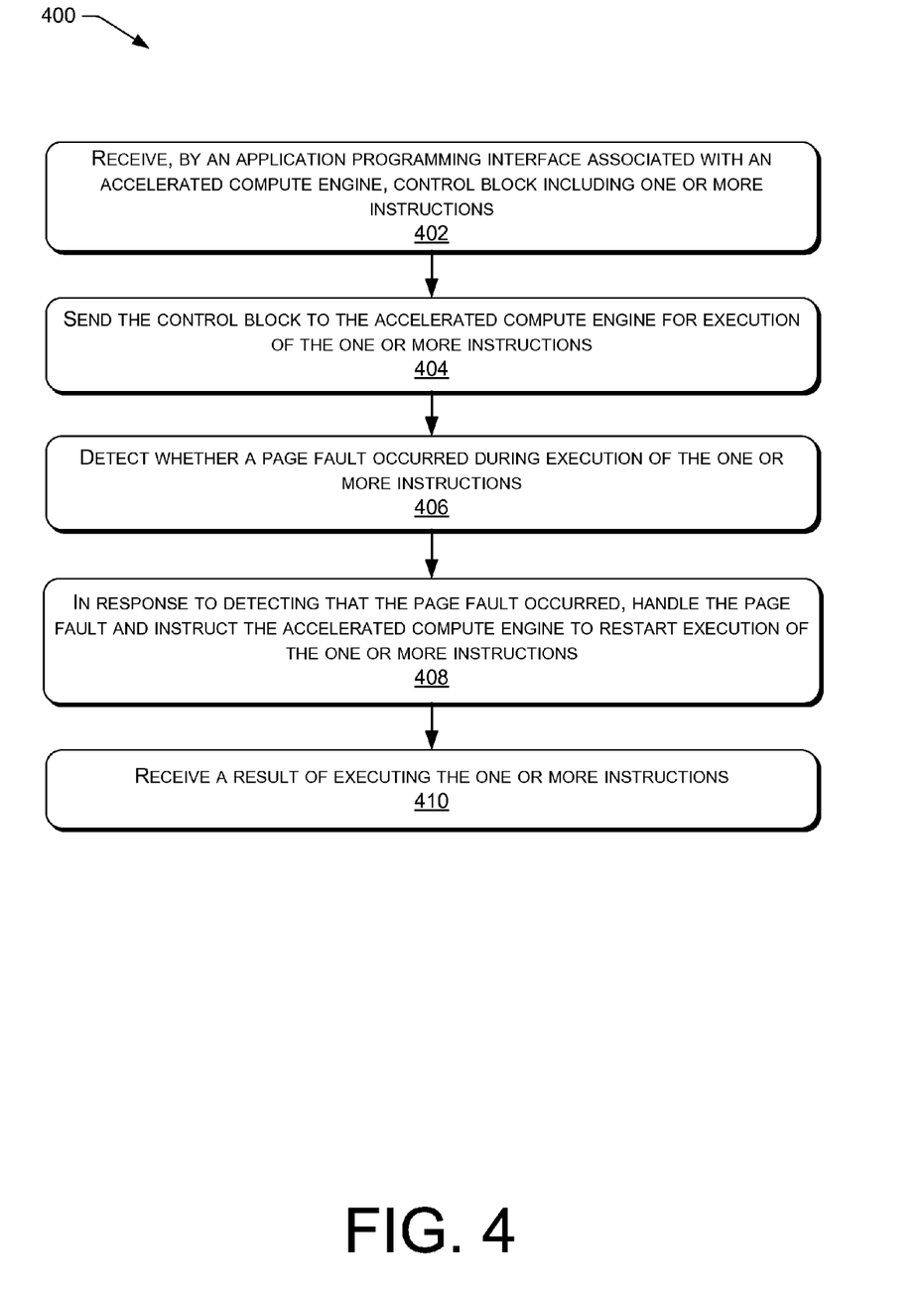
FIG. 4 illustrates a flow diagram of an example process that includes detecting whether a page fault occurred during execution of one or more instructions according to some implementations.

FIG. 4 illustrates a flow diagram of an example process that includes detecting whether a page fault occurred during execution of one or more instructions according to some implementations. The process 400 may be performed by the synchronous software interface 150 of FIG. 1.

At 402, a control block including one or more instructions is received by an application programming interface (API) associated with an accelerated compute engine. For example, in FIG. 1, an API of the ACE 110 may include the synchronous software interface 150. The synchronous software interface 150 may receive a pointer to the ACB 146 from one of the N threads 142 to 144.

At 404, the control block is sent to the accelerated compute engine for execution of the one or more instructions. For example, in FIG. 1, the synchronous interface 150 may call a lower-level asynchronous interface, such as the ACE interface 140, and include a pointer to the ACB 146. The ACE interface 140 may send the pointer to the ACB 146 to the ACE 110 to enable the ACE 110 initiate execution of the instructions 148.

At 406, the synchronous software interface may detect that a page fault occurred. For example, in FIG. 1, the synchronous software interface 150 may detect (e.g., based on a status field of the ACB 146) that the ACE 110 encountered a page fault after initiating execution of the instructions 148.

At 408, in response to determining that the page fault occurred, the page fault is handled and the accelerated compute engine is instructed to restart execution of the instructions. For example, in FIG. 1, in response to determining that the status field of the ACB 146 indicates that a page fault occurred, the synchronous software interface 150 may handle the page fault using a lower-level hardware unit (e.g., memory controller) or a lower-level software module (e.g., device driver, operating system utility, and the like). The control block may be re-sent to the ACE after the exception handler successfully handles the exception. The control block may be re-sent to enable the accelerated compute engine to identify situations where there is a lack of forward progress. After handling the page fault, the synchronous software interface 150 may instruct the ACE 110 to restart execution of the transaction by calling the ACE interface 140 and include the pointer to the ACB 146 as one of the parameters in the call.

At 410, a result of executing the one or more instructions is received. For example, in FIG. 1, the status field of the ACB 146 may indicate that the ACE successfully completed executing the instructions 148. The result may be included in an output address space that is pointed to by a pointer in the ACB 146. The synchronous software interface 150 may return the pointer to the ACB 146 to the particular thread that initially sent the pointer to the synchronous software interface 150.

System Including Synchronous Software Interface

Figure 5:
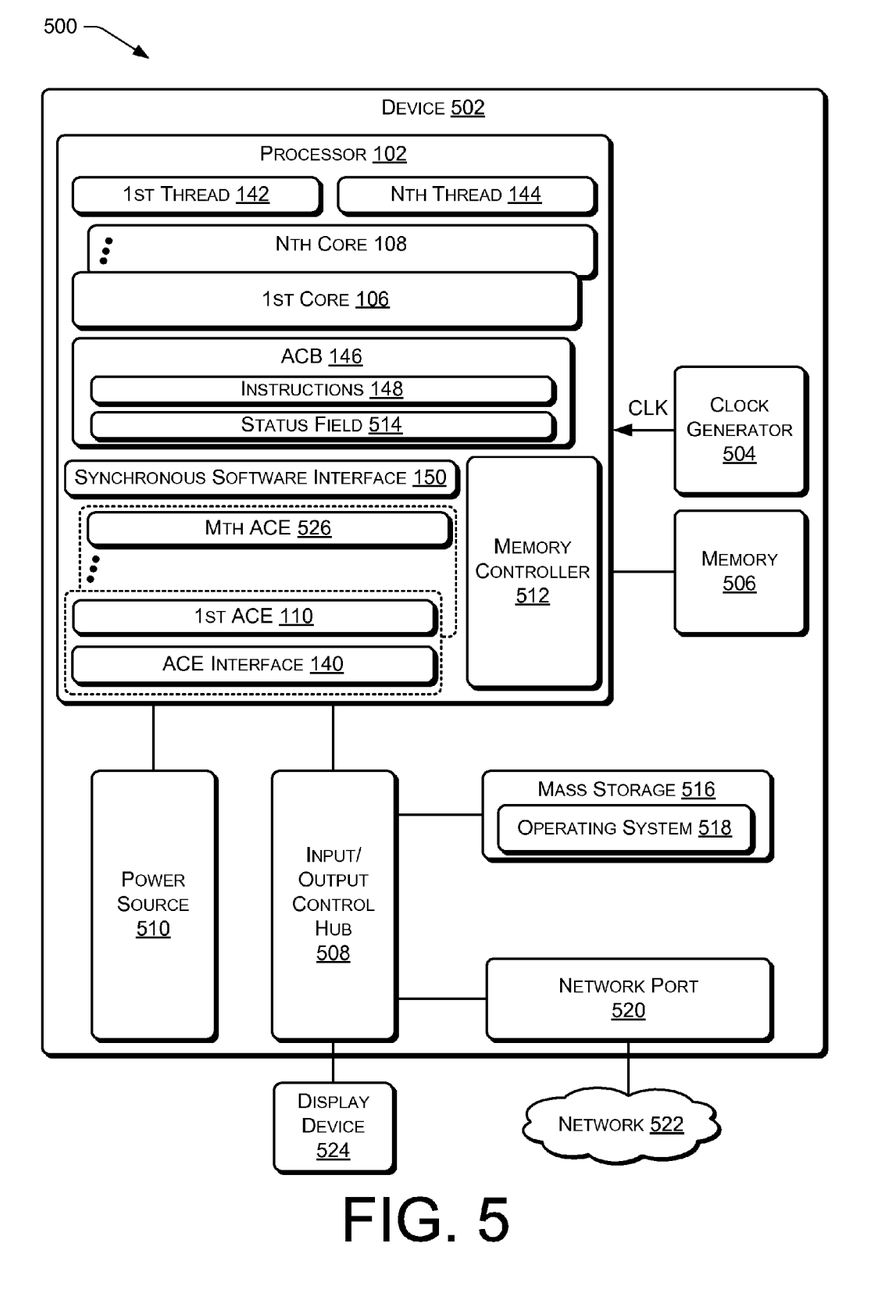
FIG. 5 illustrates an example system including a device that includes a synchronous software interface according to some implementations.

FIG. 5 an example system 500 including a device that includes a synchronous software interface according to some implementations. The framework 500 includes a computing device 502, such as a desktop computing device, a laptop computing device, tablet computing device, netbook computing device, wireless computing device, and the like.

The device 502 may include one or more processors, such as a processor 102, a clock generator 504, a memory 506 (e.g., random access memory), an input/output control hub 508, and a power source 510 (e.g., a battery or a power supply). The processor 102 may include multiple cores, such as the first core 106 and one or more additional cores, up to and including an $N^{th}$ core 108, where N is greater than 1. The processor 102 may include a memory controller 512 to enable access (e.g., reading from or writing) to the memory 506.

In addition, the processor 102 may include the ACE 110, the ACE interface 140, the synchronous software interface 150, and the N order buffers 136 to 138. In some implementations, the processor 102 may include more than one ACE. For example, as illustrated in FIG. 5, the processor 102 may include M number of ACE units (where M is greater than or equal to one), such as up to and including the $M^{th}$ ACE 526. Each of the M ACE units 110 to 526 may be accessible to the N cores 106 to 108. For example, some of the N cores 106 to 108 may simultaneously send transactions to one or more of the M ACE units 110 to 526. To illustrate, the $N^{th}$ core 108 may send two or more transactions substantially simultaneously to one or more different ACE units. The one or more ACE units may process each of the transactions and send the results back to the cores that sent the transactions. At the same time that the Nth core 108 sends the two or more tracks action, other cores may simultaneously send transactions to other ACE units in the processor 102. In some implementations, each of the M ACE units 110 to 526 may have a corresponding synchronous software interface while in other implementations multiple (e.g., at least some and possible all) ACE units may use the same synchronous software interface.

Multiple threads may execute on the N cores 106 to 108. For example, the first core 106 may execute the first thread 142 and the $N^{th}$ core 108 may execute the $N^{th}$ thread 144. The M ACE units 110 to 526 may perform specialized functions, such as graphics-related functions, for the N threads 130 to 132. The threads 130 or 132 may send transactions that include control blocks, such as the ACB 146, to instruct the ACE 110 to perform various functions. The ACB 146 may include the instructions 148 and a status field 514 that indicates a status of the ACB 146. For example, the status field 514 may indicate whether the transaction is a new transaction, whether the transaction is inside an ACE execution pipeline, whether the transaction include intermediate results, whether the transaction is done, whether a page fault has occurred, whether the transaction has been invalidated, or another status of the ACB 146. To enable fine-grained control over the operation of the M ACE units 110 to 526, the threads may enable the M ACE units 110 to 526 to directly access (e.g., read from and write to) the address space associated with each thread. The clock generator 506 may generate one or more clock signals that are the basis for an operating frequency of one or more of the N cores 218 and 512 or the ACE units of the processor 504. For example, one or more of the N cores 218 and 512 may operate at a multiple of one of the clock signals generated by the clock generator 506. The architecture depicted in FIG. 5 may use a single clock generator or multiple clock generators.

In FIG. 5, the synchronous software interface 150 is shown as being located in the processor 102. However, in some implementations, the synchronous software interface 150 may be located in another location, such as the memory 506.

The input/output control hub 508 may be coupled to a mass storage 516. The mass storage 516 may include one or more non-volatile storage devices, such as disk drives, solid state drives, and the like. An operating system 518 may be stored in the mass storage 516.

The input/output control hub 508 may be coupled to a network port 520. The network port 520 may enable the device 502 to communicate with other devices via a network 522. The network 522 may include multiple networks, such as wireline networks (e.g., public switched telephone network and the like), wireless networks (e.g., 802.11, code division multiple access (CDMA), global system for mobile (GSM), Long term Evolution (LTE) and the like), other types of communication networks, or any combination thereof. The input/output control hub may be coupled to a display device 524 that is capable of display text, graphics, and the like.

As described herein, the processor 102 may include multiple computing units or multiple cores. The processor 102 can be implemented as one or more microprocessors, microcomputers, microcontrollers, digital signal processors, central processing units, state machines, logic circuitries, and/or any devices that manipulate signals based on operational instructions. Among other capabilities, the processor 102 can be configured to fetch and execute computer-readable instructions stored in the memory 506, the mass storage 516, or other computer-readable media.

The memory 506 is an example of computer storage media for storing instructions which are executed by the processor 102 to perform the various functions described above. The memory 506 may generally include both volatile memory and non-volatile memory (e.g., RAM, ROM, or the like). The memory 506 may be referred to as memory or computer storage media herein, and may be a non-transitory media capable of storing computer-readable, processor-executable program instructions as computer program code that can be executed by the processor 102 as a particular machine configured for carrying out the operations and functions described in the implementations herein. The processor 102 may include components for enabling a resource, such as the ACE 110, to be efficiently accessed by multiple threads executing on multiple cores according to the implementations herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A processor comprising:
   a plurality of processing cores;
   specialized logic that is shared by the plurality of processing cores; and
   a memory to maintain a synchronous software interface, the synchronous software interface to:
      receive, from a first processing core of the plurality of processing cores, a control block including a transaction for execution by the specialized logic;
      send the control block to the specialized logic; and
      wait to receive a confirmation from the specialized logic that the transaction was successfully executed.

2. The processor as recited in claim 1, the synchronous software interface to:
   detect whether a page fault occurred while waiting to receive the confirmation from the specialized logic that the transaction was successfully executed.

3. The processor as recited in claim 2, the synchronous software interface to:
   handle the page fault in response to detecting that the page fault occurred; and
   re-send the control block to the specialized logic to restart execution of the transaction.

4. The processor as recited in claim 3, the synchronous software interface to:
   determine whether a number of times that execution of the transaction has been restarted satisfies a predetermined threshold; and
   in response to determining that the number of times that execution of the transaction has been restarted satisfies the predetermined threshold, send the control block including the transaction for execution to a software emulator.

5. The processor as recited in claim 4, the synchronous software interface to:
   receive a result of executing the transaction from the software emulator; and
   send the result to the first processing core.

6. The processor as recited in claim 1, the synchronous software interface to:
   receive the confirmation from the specialized logic that the transaction was successfully executed.

7. The processor as recited in claim 6, the synchronous software interface to:
   send a result of the specialized logic executing the transaction to the first processing core.

8. Computer-readable storage media including instructions executable by a processor to:
   receive a transaction from a core of the processor;
   send the transaction to an specialized logic for execution, the processor including the core and the specialized logic included in the processor; and
   detect whether a page fault occurred during execution of the transaction.

9. The computer-readable storage media as recited in claim 8, wherein the transaction is received by a synchronous software interface.

10. The computer-readable storage media as recited in claim 9, wherein the synchronous software interface is included in an application programming interface that enables access to the specialized logic.

11. The computer-readable storage media as recited in claim 8, the instructions further executable by the processor to:
   in response to detecting that the page fault occurred, handle the page fault; and instruct the specialized logic to restart execution of the transaction.

12. The computer-readable storage media as recited in claim 11, the instructions further executable by the processor to:
in response to determining that a number of times that execution of the transaction has been restarted satisfies a predetermined threshold, instruct a software emulator to execute the transaction;
receive a result of executing the transaction from the software emulator; and
send the result of executing the transaction to the core.

13. The computer-readable storage media as recited in claim 8, the instructions further executable by the processor to:
receive a result of executing the transaction from the specialized logic;
send the result of executing the transaction to the core.

14. A method comprising:
receiving, by an application programming interface associated with an specialized logic, a control block including one or more instructions;
sending the control block to a specialized logic engine, the specialized logic engine to execute the one or more instructions; and
detecting whether a page fault occurred during execution of the one or more instructions.

15. The method as recited in claim 14, wherein the control block is received from a first core of a multiple core processor.

16. The method as recited in claim 15, wherein the multiple core processor includes the specialized logic engine.

17. The method as recited in claim 15, further comprising:
receiving a result of the specialized logic engine executing the one or more instructions; and
sending the result to the first core.

18. The method as recited in claim 14, further comprising:
in response to detecting that the page fault occurred, handling the page fault; and
instructing the specialized logic engine to restart execution of the one or more instructions.

19. The method as recited in claim 18, further comprising:
determining a number of times that execution of the one or more instructions has been restarted;
determining whether the number of times that execution of the one or more instructions has been restarted satisfies a predetermined threshold; and
in response to determining that the number of times that execution of the one or more instructions has been restarted satisfies the predetermined threshold, instructing a software emulator to execute the one or more instructions.

20. The method as recited in claim 19, further comprising:
receiving a result of the software emulator executing the one or more instructions.

* * * * *